US012744201B2

(12) United States Patent
Taniguchi et al.

(10) Patent No.: US 12,744,201 B2
(45) Date of Patent: Sep. 22, 2026

(54) SECONDARY BATTERY NEGATIVE ELECTRODE, SECONDARY BATTERY, AND METHOD FOR MANUFACTURING SECONDARY BATTERY NEGATIVE ELECTRODE

(71) Applicant: Panasonic Intellectual Property Management Co., Ltd., Kadoma (JP)

(72) Inventors: Akihiro Taniguchi, Hyogo (JP); Motohiro Sakata, Osaka (JP); Kaoru Inoue, Osaka (JP); Kensuke Nakura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 503 days.

(21) Appl. No.: 18/556,013

(22) PCT Filed: Apr. 12, 2022

(86) PCT No.: PCT/JP2022/017625
§ 371 (c)(1),
(2) Date: Oct. 18, 2023

(87) PCT Pub. No.: WO2022/230661
PCT Pub. Date: Nov. 3, 2022

(65) Prior Publication Data

US 2024/0204166 A1 Jun. 20, 2024

(30) Foreign Application Priority Data

Apr. 26, 2021 (JP) ................................ 2021-073909

(51) Int. Cl.
*H01M 4/133* (2010.01)
*H01M 4/04* (2006.01)
(Continued)

(52) U.S. Cl.
CPC ......... *H01M 4/133* (2013.01); *H01M 4/0404* (2013.01); *H01M 4/134* (2013.01);
(Continued)

(58) Field of Classification Search
CPC .... H01M 4/133; H01M 4/0404; H01M 4/134; H01M 4/1393; H01M 4/1395; H01M 2004/021; H01M 2004/027
(Continued)

(56) References Cited

U.S. PATENT DOCUMENTS

2009/0253033 A1 10/2009 Hirose et al.
2012/0013051 A1 1/2012 Mah et al.
(Continued)

FOREIGN PATENT DOCUMENTS

CN 108767195 A 11/2018
JP 2013-219059 A 10/2013
(Continued)

OTHER PUBLICATIONS

Office Action dated Mar. 20, 2026, issued in counterpart CN Application No. 202280028935.3, with English translation. (13 pages).
(Continued)

*Primary Examiner* — James M Erwin
(74) *Attorney, Agent, or Firm* — WHDA, LLP

(57) ABSTRACT

A negative electrode for a secondary battery according to one aspect of the present disclosure is characterized by comprising a negative electrode current collector and a negative electrode mixture layer disposed on the negative electrode current collector, and is characterized in that: the negative electrode mixture layer contains a negative electrode active material including a carbon material and a Si-based material; a pore diameter distribution of the negative electrode mixture layer as measured by a mercury
(Continued)

press-in method has two peak values R1 and R2; the peak value R1 is in the range of 0.5-1.5 μm; the peak value R2 is in the range of 2-10 μm; an average particle diameter of the Si-based material is 4 μm or more; and the contained amount of the Si-based material with respect to the total amount of the negative electrode active material is 30 mass % or more.

9 Claims, 1 Drawing Sheet

(51) Int. Cl.
*H01M 4/134* (2010.01)
*H01M 4/1393* (2010.01)
*H01M 4/1395* (2010.01)
*H01M 4/02* (2006.01)

(52) U.S. Cl.
CPC ....... *H01M 4/1393* (2013.01); *H01M 4/1395* (2013.01); *H01M 2004/021* (2013.01); *H01M 2004/027* (2013.01)

(58) Field of Classification Search
USPC .......................................................... 429/209
See application file for complete search history.

(56) References Cited

U.S. PATENT DOCUMENTS

2015/0171414 A1* 6/2015 Takahata ............... H01M 4/133 429/212
2019/0140308 A1 5/2019 Ohsawa et al.
2021/0083269 A1* 3/2021 Kusama .............. H01M 10/054
2021/0391121 A1* 12/2021 Hayashi ............ H01M 10/0525

FOREIGN PATENT DOCUMENTS

JP 2019-087487 A 6/2019
WO 2013/080379 A1 6/2013

OTHER PUBLICATIONS

International Search Report dated Jun. 21, 2022, issued in counterpart International Application No. PCT/JP2022/017625 (4 pages).
Extended (supplementary) European Search Report dated Mar. 17, 2025, issued in counterpart EP Application No. 22795595.4.(9 pages).
Wu, J. et al., The critical role of carbon in marrying silicon and graphite anodes for high-energy lithium-ion batteries, Carbon Energy, vol. 1, No. 1, p. 57-76, 2019 (20 pages); cited in Extended European Search Report dated Mar. 17, 2025.

* cited by examiner

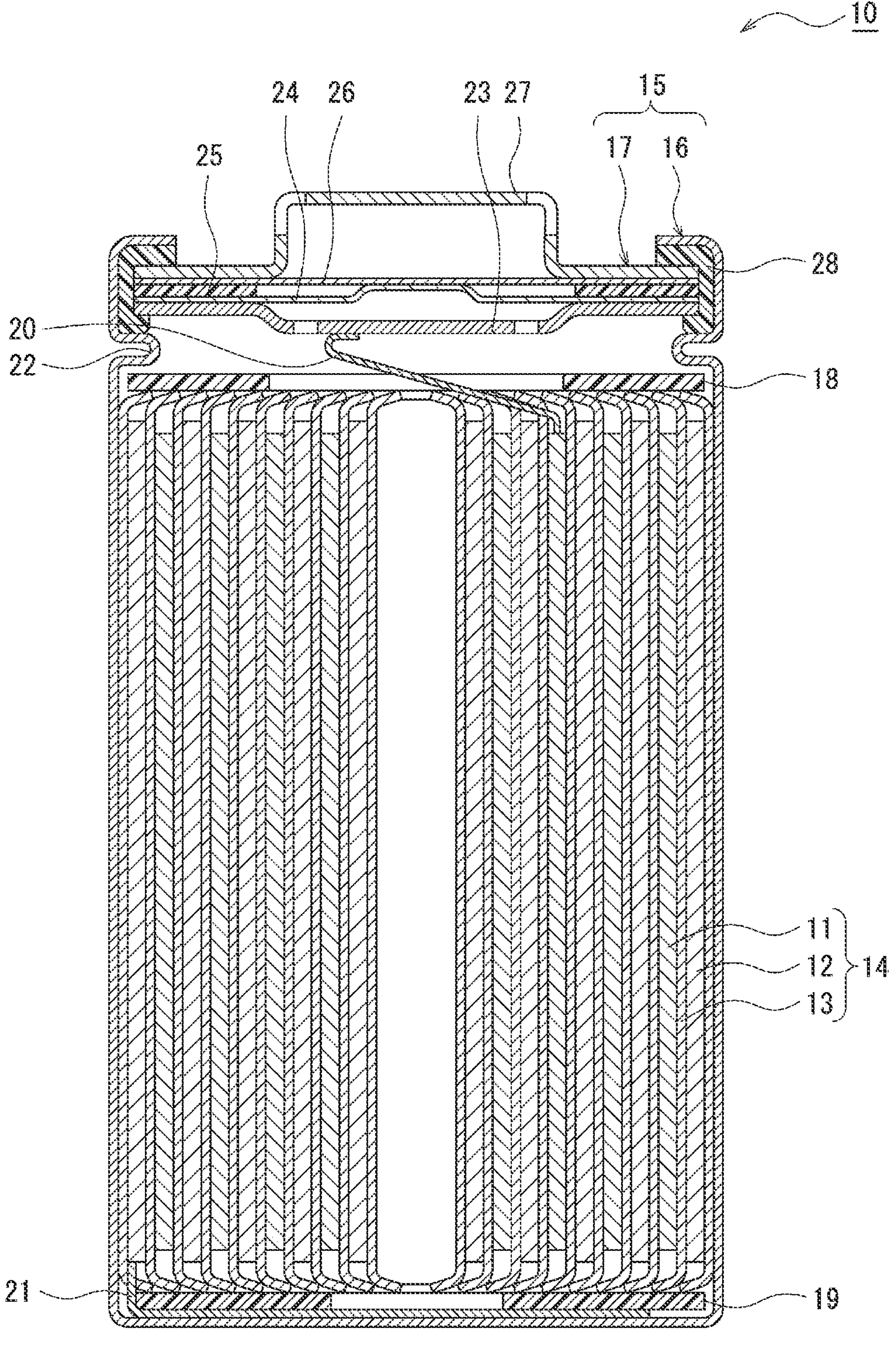
10
24
26
23
27
15
25
17
16
28
20
22
18
11
12
14
13
21
19

SECONDARY BATTERY NEGATIVE ELECTRODE, SECONDARY BATTERY, AND METHOD FOR MANUFACTURING SECONDARY BATTERY NEGATIVE ELECTRODE

CROSS REFERENCE TO RELATED APPLICATIONS

This Application is the National Stage of International Application No. PCT/JP2022/017625, filed on Apr. 12, 2022, which claims priority from Application No. 2021-073909 filed on Apr. 26, 2021 in Japan. The entire contents of these applications are incorporated herein by reference in their entirety.

TECHNICAL FIELD

The present disclosure relates to a negative electrode for a secondary battery, a secondary battery, and a method for manufacturing a negative electrode for a secondary battery.

BACKGROUND

Si-based materials are currently attracting attention as a material capable of increasing battery capacity. Si-based materials are capable of electrochemically occluding and releasing lithium ions, and can charge and discharge at very large capacities compared to carbon materials such as graphite.

For example, Patent Literature 1 discloses a negative electrode active material for a lithium ion secondary battery containing a Si-based material represented by SiOx ($0<x<2$) and a carbon material, in which the negative electrode active material for a lithium ion secondary battery has internal voids.

CITATION LIST

Patent Literature

Patent Literature 1: JP 2013-219059 A

SUMMARY

Technical Problem

By the way, the Si-based material increase the capacity of secondary batteries, but has a problem with swelling of the negative electrode and deterioration of charge-discharge cycle characteristics. Although the technology of Patent Literature 1 can suppress the deterioration of charge-discharge cycle characteristics, further improvement is desired.

Therefore, an object of the present disclosure is to provide a negative electrode for a secondary battery, a secondary battery, and a method for manufacturing a negative electrode for a secondary battery, which are capable of increasing the capacity, suppressing swelling of the negative electrode, and further suppressing deterioration of charge-discharge cycle characteristics.

Solution to Problem

A negative electrode for a secondary battery according to one aspect of the present disclosure includes a negative electrode current collector and a negative electrode mixture layer disposed on the negative electrode current collector, in which the negative electrode mixture layer includes a negative electrode active material containing a carbon material and a Si-based material, the negative electrode mixture layer has a pore diameter distribution with two peak values R1 and R2 as measured by mercury porosimetry, the peak value R1 is greater than or equal to 0.5 μm and less than or equal to 1.5 μm, the peak value R2 is greater than or equal to 2 μm and less than or equal to 10 μm, the Si-based material has an average particle diameter of greater than or equal to 4 μm, and the Si-based material has a content of greater than or equal to 30 mass % of the total amount of the negative electrode active material.

A secondary battery according to an aspect of the present disclosure includes the negative electrode for a secondary battery.

A method for producing a negative electrode for a secondary battery according to one aspect of the present disclosure includes: a first step of applying a negative electrode paste including a negative electrode active material containing a carbon material and a Si-based material, and a pore-foaming material to a negative electrode current collector, and then rolling the coating film: a second step of heat-treating the coating film after the first step, thereby decomposing and vaporizing the pore-forming material to form a negative electrode mixture layer, in which the negative electrode mixture layer has a pore diameter distribution with two peak values R1 and R2 as measured by mercury porosimetry, the peak value R1 is greater than or equal to 0.5 μm and less than or equal to 1.5 μm, the peak value R2 is greater than or equal to 2 μm and less than or equal to 10 μm, the Si-based material has an average particle diameter of greater than or equal to 4 μm, and the Si-based material has a content of greater than or equal to 30 mass % of the total amount of the negative electrode active material.

Advantageous Effects of Invention

According to the present disclosure, it is possible to provide a negative electrode for a secondary battery, a secondary battery, and a method for manufacturing a negative electrode for a secondary battery capable of increasing the capacity, suppressing swelling of the negative electrode, and further suppressing deterioration of charge-discharge cycle characteristics.

BRIEF DESCRIPTION OF DRAWINGS

FIG. 1 is a sectional view of a secondary battery of an example of an embodiment.

DESCRIPTION OF EMBODIMENTS

A secondary battery negative electrode according to one aspect of the present disclosure includes a negative electrode current collector and a negative electrode mixture layer disposed on the negative electrode current collector, in which the negative electrode mixture layer includes a negative electrode active material containing a carbon material and a Si-based material, the negative electrode mixture layer has a pore diameter distribution with two peak values R1 and R2 as measured by mercury porosimetry, the peak value R1 is greater than or equal to 0.5 μm and less than or equal to 1.5 μm, the peak value R2 is greater than or equal to 2 μm and less than or equal to 10 μm, the Si-based material has an average particle diameter of greater than or equal to 4 μm, and the Si-based material has a content of greater than or equal to 30 mass % of the total amount of the negative electrode active material. As in the present disclosure, the negative electrode mixture layer having two peak values (R1 and R2) in the pore diameter distribution that satisfy the above range is presumably capable of increasing the battery capacity and suppressing swelling of the negative electrode because it has voids optimal for improving permeability of the electrolytic solution and absorbing the expansion and shrinkage of the Si-based material during charging and discharging. However, even when R1 and R2 are set in appropriate ranges, if the average particle diameter of the Si-based material is too small, the effect of suppressing the deterioration of the charge-discharge cycle characteristics cannot be sufficiently achieved due to the side reaction between the Si-based material and the electrolytic solution. In addition, even if R1 and R2 are set in appropriate ranges, if the content of the Si-based material is too small, the battery cannot achieve a high capacity. Therefore, only by setting all the parameters of the two peak values R1 and R2 in the pore diameter distribution of the negative electrode mixture layer measured by mercury porosimetry and the average particle diameter and content of the Si-based material within the above appropriate ranges, it is possible to achieve a high capacity, suppress swelling of the negative electrode, and also suppress deterioration of charge-discharge cycle characteristics.

Hereinafter, embodiments of the negative electrode active material for secondary batteries and the secondary battery according to the present disclosure will be described in detail with reference to the drawing.

Hereinafter, an example of the secondary battery according to an aspect of the present disclosure will be described.

FIG. 1 is a sectional view of a secondary battery of an example of an embodiment. A secondary battery 10 shown in FIG. 1 includes a wound electrode assembly 14 in which a positive electrode 11 and a negative electrode 12 are wound with a separator 13 interposed therebetween, an electrolytic solution, insulating plates 18 and 19 disposed on the upper and lower sides of the electrode assembly 14 respectively, and a battery case 15 housing the above-described members. The battery case 15 includes a bottomed cylindrical case body 16 and a sealing assembly 17 that seals an opening of the case body 16. Instead of the wound electrode assembly 14, an electrode assembly having another form, such as a stacked electrode assembly in which positive electrodes and negative electrodes are alternately stacked with separators interposed therebetween, may be applied. Examples of the battery case 15 include metal cases having a cylindrical shape, a square shape, a coin shape, a button shape, or the like, and resin cases (so-called laminated type) formed by lamination with a resin sheet.

The electrolytic solution may be an aqueous electrolytic solution, but is preferably a non-aqueous electrolytic solution containing a non-aqueous solvent and an electrolyte salt dissolved in the non-aqueous solvent. Examples of the non-aqueous solvent include esters, ethers, nitriles, amides, and mixtures of two or more of them. The non-aqueous solvent may contain a halogen-substituted product in which at least a part of hydrogen in a solvent described above is substituted with a halogen atom such as fluorine. Examples of the electrolyte salt include lithium salts such as $LiPF_6$.

The case body 16 is, for example, a bottomed cylindrical metal container. A gasket 28 is provided between the case body 16 and the sealing assembly 17 to ensure the sealability inside the battery. The case body 16 has a projecting portion 22 in which, for example, a part of the side part of the case body 16 protrudes inward to support the sealing assembly 17. The projecting portion 22 is preferably formed in an annular shape along the circumferential direction of the case body 16, and supports the sealing assembly 17 on its upper surface.

The sealing assembly 17 has a structure in which a filter 23, a lower vent member 24, an insulating member 25, an upper vent member 26, and a cap 27 are sequentially stacked from the electrode assembly 14 side. Each member included in the sealing assembly 17 has, for example, a disk shape or a ring shape, and the members excluding the insulating member 25 are electrically connected to each other. The lower vent member 24 and the upper vent member 26 are connected to each other at their central parts, and the insulating member 25 is interposed between the circumferential parts of the lower vent member 24 and the upper vent member 26. When the internal pressure of the secondary battery 10 increases due to heat generated by an internal short circuit or the like, for example, the lower vent member 24 deforms so as to push the upper vent member 26 up toward the cap 27 side and breaks, and thus the current pathway between the lower vent member 24 and the upper vent member 26 is cut off. When the internal pressure further increases, the upper vent member 26 breaks, and gas is discharged from an opening of the cap 27.

In the secondary battery 10 shown in FIG. 1, a positive electrode lead 20 attached to the positive electrode 11 extends to the sealing assembly 17 side through a through hole of the insulating plate 18, and a negative electrode lead 21 attached to the negative electrode 12 extends to the bottom side of the case body 16 through the outside of the insulating plate 19. The positive electrode lead 20 is connected to the lower surface of the filter 23, which is the bottom plate of the sealing assembly 17, by welding or the like, and the cap 27, which is electrically connected to the filter 23 and is the top plate of the sealing assembly 17, serves as a positive electrode terminal. The negative electrode lead 21 is connected to the bottom inner surface of the case body 16 by welding or the like, and the case body 16 serves as a negative electrode terminal.

Hereinafter, the positive electrode 11, the negative electrode 12, and the separator 13 will be described in detail.

[Positive Electrode]

The positive electrode 11 includes a positive electrode current collector and a positive electrode mixture layer disposed on the positive electrode current collector. The positive electrode current collector may be, for example, a foil of a metal, such as aluminum, that is stable in a potential range of the positive electrode 11, a film in which the metal is disposed on its surface layer. The positive electrode mixture layer includes, for example, a positive electrode active material, a binder, a conductive agent, and the like. The positive electrode 11 can be manufactured by, for example, applying a positive electrode paste including a positive electrode active material, a binding material, a conductive agent, and the like to a surface of a positive electrode current collector, drying the coating film, and then rolling the coating film to form a positive electrode mixture layer on both surfaces of the positive electrode current collector.

Examples of the conductive agent contained in the positive electrode mixture layer include carbon materials such as carbon black, acetylene black, Ketjenblack, graphite, and carbon nanotubes. Examples of the binder included in the positive electrode mixture layer include fluororesins such as polytetrafluoroethylene (PTFE) and polyvinylidene fluoride (PVdF), polyacrylonitrile (PAN), polyimide, acrylic resins, polyolefins, styrene-butadiene rubber (SBR), cellulose derivatives such as carboxymethyl cellulose (CMC) and its salts, and polyethylene oxide (PEO).

Examples of the positive electrode active substance include lithium transition metal composite oxides. Examples of a metal element contained in the lithium transition metal composite oxide include Ni, Co, Mn, Al, B, Mg, Ti, V, Cr, Fe, Cu, Zn, Ga, Sr, Zr, Nb, In, Sn, Ta, or W. Among them, it is preferable to contain at least one of Ni, Co, or Mn. A suitable example of the lithium transition metal composite oxide is a composite oxide represented by a general formula: $LiMO_2$ (where M is Ni and X, X is a metal element other than Ni, and the ratio of Ni is greater than or equal to 50 mol % and less than or equal to 95 mol % based on the total number of moles of the metal element except Li). Examples of X in the above formula include Co, Mn, Al, B, Mg, Ti, V, Cr, Fe, Cu, Zn, Ga, Sr, Zr, Nb, In, Sn, Ta, and W.

[Negative Electrode]

The negative electrode 12 includes a negative electrode current collector and a negative electrode mixture layer disposed on the negative electrode current collector. The negative electrode current collector may be, for example, a foil of a metal, such as copper, that is stable in a potential range of the negative electrode 12, a film in which the metal is disposed on its surface layer. The negative electrode mixture layer includes a negative electrode active material, and may include a binding material, a conductive agent, and the like. The negative electrode active material includes a carbon material and a Si-based material. The negative electrode active material may include a material capable of reversibly occluding and releasing lithium ions in addition to the carbon material and the Si-based material. Examples of the binding material and the conductive agent include those similar to those for the positive electrode 11.

The pore diameter distribution of the negative electrode mixture layer measured by mercury porosimetry has two peak values R1 and R2. The peak value R1 is greater than or equal to 0.5 μm and less than or equal to 1.5 μm, and the peak value R2 is greater than or equal to 2 μm and less than or equal to 10 μm.

In mercury porosimetry, mercury is pressurized to infiltrate mercury into pores of a solid sample, and the diameter and volume of the pores are calculated from the pressure applied to the mercury and the amount of mercury injected into the pores. When the mercury to which the pressure P is applied can enter the pores having the diameter D, the diameter D of the pores is determined from the pressure P, the contact angle θ of the mercury, and the surface tension σ of the mercury according to the following equation. The pore volume is calculated from the amount of the mercury injected into the pores. In the present disclosure, the pore diameter is the diameter of pores.

$$-4\sigma\cos\theta = PD$$

The pore diameter distribution measured by mercury porosimetry is a graph of Log differential pore volume ($cm^3/g$) plotted against the average pore diameter (μm) in a section of each measurement point, where the horizontal axis is the pore diameter (μm) and the vertical axis is the Log differential pore volume ($cm^3/g$). Here, in the present disclosure, the peak value in the pore diameter distribution means a pore diameter at a peak in the pore diameter distribution.

The peak value R1 should be greater than or equal to 0.5 μm and less than or equal to 1.5 μm, and is preferably, for example, greater than or equal to 0.8 μm and less than or equal to 1.2 μm. When the peak value R1 is less than 0.5 μm, there are many small voids between the particles in the negative electrode mixture layer, so that the permeability of the electrolytic solution decreases, and the secondary battery cannot achieve a high capacity. When the peak value R1 is greater than 1.5 μm (less than 2 μm), the density of the negative electrode active material decreases, and the secondary battery cannot achieve a high capacity. The peak value R2 may be greater than or equal to 2 μm and less than or equal to 10 μm, and is preferably, for example, greater than or equal to 4 μm and less than or equal to 8 μm. When the peak value R2 is less than 2 μm, there are few voids in the negative electrode mixture layer that can absorb expansion and shrinkage of the Si-based material during charging and discharging, so that the swelling of the anode cannot be suppressed. When the peak value R2 is greater than or equal to 10 μm, there are many large voids in the negative electrode mixture layer, so that the density of the negative electrode active material decreases, and the secondary battery cannot achieve a high capacity.

The measurement of the pore diameter distribution by mercury porosimetry is performed on the negative electrode mixture layer before initial charging. For example, by using a measurement sample obtained by punching a negative electrode for a secondary battery into a predetermined shape before initial charging, the pore diameter distribution of the negative electrode mixture layer included in the measurement sample can be measured by mercury porosimetry. The measurement sample only needs to have at least the negative electrode mixture layer on its surface, and may have other configurations such as a negative electrode current collector.

The measurement of the pore diameter distribution by mercury porosimetry can be performed using, for example, an apparatus such as Autopore IV 9500 series manufactured by MicroMeltics. In the measurement, a measurement sample is sealed in a sample container under an inert atmosphere, mercury is injected into the sample container, and pressure is applied to the mercury. Here, the pressure applied to mercury is appropriately adjusted according to the size of the pore diameter that the measurement sample can have, and is not particularly limited, but for example, varying the pressure from 0.5 psi (3.4 kPa) to 60000 psi (413,400 kPa) is preferred in order to measure a wide range of pore diameter.

As described above, in order to increase the capacity of the secondary battery, suppress swelling of the negative electrode, and further suppress deterioration of charge-discharge cycle characteristics, the peak value R1 must be greater than or equal to 0.5 μm and less than or equal to 1.5 μm and the peak value R2 must be greater than or equal to 2 μm and less than or equal to 10 μm, and the content and average particle diameter of the Si-based material must be within appropriate ranges. Hereinafter, the Si-based material and the carbon material contained in the negative electrode active material will be described.

The Si-based material included in the negative electrode active material is not particularly limited as long as it can reversibly occlude and release ions such as lithium ions, and examples thereof include Si particles, alloy particles containing Si, and Si compound particles. These may be used alone or in combination of two or more thereof.

The Si particles can be obtained, for example, using a gas phase method or by grinding silicon swarf finely, and whichever method is used for manufacturing Si particles, the Si particles can be used. Examples of the alloy particles containing Si include alloys containing Si and a metal selected from alkali metals, alkaline earth metals, transition metals, rare earth metals, and combinations thereof. Examples of the Si compound particles include Si compound particles having a silicate phase and Si particles dispersed in the silicate phase, Si compound particles having a silicon oxide phase and Si particles dispersed in the silicon oxide phase, and Si compound particles having a carbon phase and Si particles dispersed in the carbon phase. Among them, Si compound particles having a silicate phase and Si particles dispersed in the silicate phase or Si compound particles having a carbon phase and Si particles dispersed in the carbon phase are preferable from the viewpoint of increasing the capacity of the secondary battery or suppressing a deterioration of charge-discharge cycle characteristics.

The silicate phase preferably includes, for example, at least one element selected from lithium, sodium, potassium, rubidium, cesium, francium, beryllium, magnesium, calcium, strontium, barium, and radium from the viewpoints of high lithium ion conductivity and the like. Among the silicate phases, a silicate phase including lithium (hereinafter, sometimes referred to as lithium silicate phase) is preferable from the viewpoints of high lithium ion conductivity and the like.

The lithium silicate phase is represented by, for example, the formula: $Li_{2z}SiO_{2+z}$ ($0<z<2$). From the viewpoints of stability, ease of production, lithium ion conductivity, and the like, z preferably satisfies the relation of $0<z<1$, and more preferably $z=1/2$.

The Si compound particles in which Si particles are dispersed in a silicon oxide phase is represented by, for example, a general formula SiOx (in which x is preferably in the range of $0<x<2$, and more preferably in the range of $0.5\leq x\leq 1.6$). The Si compound particles in which Si particles are dispersed in a carbon phase are represented by, for example, the general formula SixCy (in which x and y are preferably in the ranges of $0<x\leq 1$ and $0<y\leq 1$, and more preferably in the ranges of $0.3\leq x\leq 0.45$ and $0.55\leq y\leq 0.7$).

The Si-based material preferably has a particle surface on which a conductive film including a material having high conductivity is formed. Examples of the conductive film include carbon films, metal films, and metal compound films, and a carbon film is preferable from the viewpoints of electrochemical stability and the like. The carbon film can be formed with, for example, a CVD method in which acetylene, methane, or the like is used, a method in which coal pitch, petroleum pitch, a phenol resin, or the like is mixed with a silicon-based active material and the mixture is heat-treated, or the like. The conductive film may also be formed by fixing a conductive filler such as carbon black to the particle surface of the Si-based material using a binder.

The content of the Si-based material may be greater than or equal to 30 mass % of the total amount of the negative electrode active material from the viewpoint of increasing the capacity of the secondary battery and the like. In addition, from the viewpoint of achieving a high capacity of the secondary battery and further suppressing swelling of the negative electrode, the content of the Si-based material is preferably greater than or equal to 30 mass % and less than or equal to 60 mass %, and more preferably greater than or equal to 35 mass % and less than or equal to 55 mass % of the total amount of the negative electrode active material.

The average particle diameter of the Si-based material may be, for example, greater than or equal to 4 μm from the viewpoint of suppressing deterioration of charge-discharge cycle characteristics due to a side reaction with the electrolytic solution. In addition, the average particle diameter of the Si-based material is, for example, preferably greater than or equal to 4 μm and less than or equal to 12 μm, and more preferably greater than or equal to 6 μm and less than or equal to 10 μm from the viewpoint of suppressing deterioration of charge-discharge cycle characteristics and further suppressing swelling of the negative electrode.

Examples of the carbon material included in the negative electrode active material include conventionally known carbon materials used as negative electrode active materials for secondary batteries, but graphite such as natural graphite such as scale-like graphite, massive graphite, and earth graphite, massive artificial graphite (MAG), and artificial graphite such as mesocarbon microbeads (MCMB) are preferable from the viewpoint of more suppressing deterioration of charge-discharge cycle characteristics.

The average particle diameter of the carbon material is, for example, preferably greater than or equal to 10 μm and less than or equal to 25 μm, and more preferably greater than or equal to 12 μm and less than or equal to 20 μm from the viewpoint of further suppressing swelling of the negative electrode.

The average particle diameter of each material is a volume average particle diameter D50, which is 50% of the volume integrated value in the particle diameter distribution obtained by laser diffraction scattering.

The content of the carbon material is, for example, preferably greater than or equal to 40 mass % and less than or equal to 70 mass %, more preferably greater than or equal to 45 mass % and less than or equal to 65 mass % of the total amount of the negative electrode active material.

An example of a method of manufacturing the negative electrode 12 will be described. The negative electrode 12 includes: a first step of applying a negative electrode paste including a negative electrode active material containing a carbon material and a Si-based material, a pore-forming material, and a binding material or the like added as necessary to a negative electrode current collector to prepare a coating film, and then rolling the coating film; and a second step of heating the coating film after the first step to decompose and vaporize the pore-forming material to form a negative electrode mixture layer. The average particle diameter and content of the Si-based material and the carbon material are as described above, and will not be described.

By heat-treating the coating film to decompose and vaporize (for example, sublimate) the pore-forming material, and releasing the pore-forming material from within the coating film, not only small voids but also relatively large voids are formed between the particles in the negative electrode mixture layer. As described above, when the negative electrode paste to which the pore-forming material is added is heat-treated, the pore distribution of the negative electrode mixture layer has a peak value R1 of greater than or equal to 0.5 μm and less than or equal to 1.5 μm and a peak value R2 of greater than or equal to 2 μm and less than or equal to 10 μm. On the other hand, when a negative electrode paste containing no pore-forming material is used, only small voids are formed between particles in the obtained negative electrode mixture layer. Therefore, when a negative electrode paste with no pore-forming material added is used, the pore distribution of the negative electrode mixture layer usually has only the peak value R1 of greater than or equal to 0.5 μm and less than or equal to 1.5 μm.

The heat treatment temperature is not particularly limited as long as it is a temperature at which the pore-forming material is decomposed and vaporized. The heat treatment time should be sufficient to decompose and vaporize the pore-forming material in the coating film, for example, greater than or equal to 5 hours.

The pore-forming material may be any known material. Examples of the pore-forming material include metal oxalates, camphor, and naphthalene. Other examples of the pore-forming material include dicarboxylic acids such as fumaric acid, malonic acid, and malic acid. The average particle diameter of the pore-forming material is preferably, for example, greater than or equal to 2 μm and less than or equal to 10 μm. By setting the average particle diameter of the pore-forming material within the above range, the peak value R2 in the pore diameter distribution of the negative electrode mixture layer can be easily controlled to a range of greater than or equal to 2 μm and less than or equal to 10 μm. When a pore-forming material having an average particle diameter outside the above range is used, the peak values R2 and R1 in the pore diameter distribution of the negative electrode mixture layer can be controlled by adjusting the average particle diameter of each material used for the negative electrode active material, the viscosity of the negative electrode paste by adding a solvent or the like, the heat treatment time and temperature, and the linear pressure during rolling of the coating film, and the like.

Examples of the mixing of the raw materials such as the negative electrode active material, the pore-forming material, and the binding material in obtaining the negative electrode paste include cutter mills, pin mills, bead mills, fine particle composing machines (devices in which shear force is generated between a specially shaped rotor rotating at a high speed inside a tank and a collision plate), granulators, and kneading machines such as twin-screw extruders and planetary mixers.

The negative electrode paste is applied using, for example, a slit die coater, a reverse roll coater, a lip coater, a blade coater, a knife coater, a gravure coater, or a dip coater.

When the negative electrode paste is applied to the negative electrode current collector to obtain a coating film, the coating film is preferably heat-dried. The temperature for heat-drying is preferably a temperature at which the pore-forming material does not decompose or vaporize, but a part of the porous material may decompose or vaporize during heat-drying.

The rolling of the coating film may be performed several times at a predetermined linear pressure, for example, with a roll press machine until the coating film has a predetermined thickness.

[Separator]

As the separator 13, for example, a porous sheet having an ion permeation property and an insulation property is used. Specific examples of the porous sheet include fine porous thin films, woven fabrics, and nonwoven fabrics. As a material of the separator 13, polyolefin such as polyethylene and polypropylene, cellulose, and the like are suitable. The separator 13 may have a single-layered structure or a multilayered structure. On the surface of the separator, a heat-resistant layer or the like may be formed.

EXAMPLES

Hereinafter, the present disclosure will be further described with reference to Examples, but the present disclosure is not limited to these Examples.

Example 1

[Manufacturing of Negative Electrode]

Graphite particles having an average particle diameter of 17 μm and a Si-based material having an average particle diameter of 8 μm and Si particles dispersed in a carbon phase were mixed at a mass ratio of 50:50. This mixture was used as a negative electrode active material. Then, the negative electrode active material, carboxymethyl cellulose (CMC), styrene-butadiene copolymer rubber (SBR), multi-walled carbon nanotubes, and fumaric acid (average particle diameter: 6 μm) were mixed at a mass ratio of 100:1:1:1:12.5, and the mixture was mixed with given water to prepare a negative electrode paste. The negative electrode paste was applied to both surfaces of a negative electrode current collector made of a copper foil, and the coating film was dried and then rolled with a roller. Thereafter, the coating film was heat-treated at 200° ° C. for 5 hours to produce a negative electrode in which a negative electrode mixture layer was formed on both surfaces of a negative electrode current collector.

In the obtained negative electrode, the pore diameter distribution of the negative electrode mixture layer was measured by mercury porosimetry and showed two peak values R1 and R2, where the peak value R1 was 1 μm and the peak value R2 was 6 μm.

[Manufacturing of Positive Electrode]

A lithium-transition metal composite oxide represented by $LiCo_{1/3}Mn_{1/3}Ni_{1/3}O_2$, acetylene black, and polyvinylidene fluoride were mixed at a mass ratio of 98:1:1, and then N-methyl-2-pyrrolidone (NMP) was added to prepare a positive electrode paste. The negative electrode paste was applied to both surfaces of an aluminum foil, the coating film was dried and then rolled with a roller to produce a positive electrode in which a positive electrode mixture layer was formed on both surfaces of a positive electrode current collector.

[Preparation of Non-Aqueous Electrolytic Solution]

In a mixed solvent obtained by mixing ethylene carbonate (EC) and ethyl methyl carbonate (EMC) at a mass ratio of 1:3, $LiPF_6$ was dissolved at a concentration of 1 mol/L to prepare a non-aqueous electrolytic solution.

[Production of Test Cell]

The positive electrode and the negative electrode were stacked so as to face each other with a polyolefin separator interposed therebetween, and the resulting product was wound to produce an electrode assembly. Next, the electrode assembly was housed in a bottomed cylindrical battery case body, the non-aqueous electrolytic solution was injected, and then the opening of the battery case body was sealed with a gasket and a sealing assembly to produce a test cell.

Example 2

A negative electrode was produced in the same manner as in Example 1 except that fumaric acid having an average particle diameter of 2 μm was used, and a test cell was produced in the same manner as in Example 1 except that the negative electrode was used. In the negative electrode of Example 2, the pore diameter distribution of the negative electrode mixture layer was measured by mercury porosimetry and showed two peak values R1 and R2, where the peak value R1 was 1 μm and the peak value R2 was 2 μm.

Example 3

A negative electrode was produced in the same manner as in Example 1 except that fumaric acid having an average particle diameter of 10 μm was used, and a test cell was produced in the same manner as in Example 1 except that the negative electrode was used. In the negative electrode of Example 3, the pore diameter distribution of the negative electrode mixture layer was measured by mercury porosimetry and showed two peak values R1 and R2, where the peak value R1 was 1 μm and the peak value R2 was 10 μm.

Example 4

A negative electrode was produced in the same manner as in Example 1 except that graphite particles having an average particle diameter of 17 μm were mixed with a Si-based material having an average particle diameter of 8 μm, in which Si particles were dispersed in a carbon phase, at a mass ratio of 70:30, and a test cell was produced in the same manner as in Example 1 except that the negative electrode was used. In the negative electrode of Example 4, the pore diameter distribution of the negative electrode mixture layer was measured by mercury porosimetry and showed two peak values R1 and R2, where the peak value R1 was 1 μm and the peak value R2 was 6 μm.

Example 5

A negative electrode was produced in the same manner as in Example 1 except that graphite particles having an average particle diameter of 17 μm were mixed with a Si-based material having an average particle diameter of 8 μm, in which Si particles were dispersed in a carbon phase, at a mass ratio of 40:60, and a test cell was produced in the same manner as in Example 1 except that the negative electrode was used. In the negative electrode of Example 5, the pore diameter distribution of the negative electrode mixture layer was measured by mercury porosimetry and showed two peak values R1 and R2, where the peak value R1 was 1 μm and the peak value R2 was 6 μm.

Example 6

A negative electrode was produced in the same manner as in Example 1 except that a Si-based material having an average particle diameter of 4 μm in which Si particles were dispersed in a carbon phase was used, and a test cell was produced in the same manner as in Example 1 except that the negative electrode was used. In the negative electrode of Example 6, the pore diameter distribution of the negative electrode mixture layer was measured by mercury porosimetry and showed two peak values R1 and R2, where the peak value R1 was 1 μm and the peak value R2 was 6 μm.

Example 7

A negative electrode was produced in the same manner as in Example 1 except that a Si-based material having an average particle diameter of 12 μm in which Si particles were dispersed in a carbon phase was used, and a test cell was produced in the same manner as in Example 1 except that the negative electrode was used. In the negative electrode of Example 7, the pore diameter distribution of the negative electrode mixture layer was measured by mercury porosimetry and showed two peak values R1 and R2, where the peak value R1 was 1 μm and the peak value R2 was 6 μm.

Example 8

A negative electrode was produced in the same manner as in Example 1 except that graphite particles having an average particle diameter of 10 μm were used, and a test cell was produced in the same manner as in Example 1 except that the negative electrode was used. In the negative electrode of Example 8, the pore diameter distribution of the negative electrode mixture layer was measured by mercury porosimetry and showed two peak values R1 and R2, where the peak value R1 was 1 μm and the peak value R2 was 6 μm.

Example 9

A negative electrode was produced in the same manner as in Example 1 except that graphite particles having an average particle diameter of 25 μm were used, and a test cell was produced in the same manner as in Example 1 except that the negative electrode was used. In the negative electrode of Example 8, the pore diameter distribution of the negative electrode mixture layer was measured by mercury porosimetry and showed two peak values R1 and R2, where the peak value R1 was 1 μm and the peak value R2 was 6 μm.

Example 10

A negative electrode was produced in the same manner as in Example 1 except that graphite particles having an average particle diameter of 17 μm were mixed with a Si-based material having an average particle diameter of 8 μm, in which Si particles were dispersed in a carbon phase, at a mass ratio of 30:70, and a test cell was produced in the same manner as in Example 1 except that the negative electrode was used. In the negative electrode of Example 10, the pore diameter distribution of the negative electrode mixture layer was measured by mercury porosimetry and showed two peak values R1 and R2, where the peak value R1 was 1 μm and the peak value R2 was 6 μm.

Example 11

A negative electrode was produced in the same manner as in Example 1 except that a Si-based material having an average particle diameter of 14 μm in which Si particles were dispersed in a carbon phase was used, and a test cell was produced in the same manner as in Example 1 except that the negative electrode was used. In the negative electrode of Example 11, the pore diameter distribution of the negative electrode mixture layer was measured by mercury porosimetry and showed two peak values R1 and R2, where the peak value R1 was 1 μm and the peak value R2 was 6 μm.

Example 12

A negative electrode was produced in the same manner as in Example 1 except that graphite particles having an average particle diameter of 8 μm were used, and a test cell was produced in the same manner as in Example 1 except that the negative electrode was used. In the negative electrode of Example 12, the pore diameter distribution of the negative electrode mixture layer was measured by mercury porosimetry and showed two peak values R1 and R2, where the peak value R1 was 1 μm and the peak value R2 was 6 μm.

Example 13

A negative electrode was produced in the same manner as in Example 1 except that graphite particles having an average particle diameter of 40 μm were used, and a test cell was produced in the same manner as in Example 1 except that the negative electrode was used. In the negative electrode of Example 12, the pore diameter distribution of the negative electrode mixture layer was measured by mercury porosimetry and showed two peak values R1 and R2, where the peak value R1 was 1 μm and the peak value R2 was 6 μm.

Comparative Example 1

A negative electrode was produced in the same manner as in Example 1 except that fumaric acid having an average particle diameter of 12 μm was used, and a test cell was produced in the same manner as in Example 1 except that the negative electrode was used. In the negative electrode of Comparative Example 1, the pore diameter distribution of the negative electrode mixture layer was measured by mercury porosimetry and showed two peak values R1 and R2, where the peak value R1 was 1 μm and the peak value R2 was 12 μm.

Comparative Example 2

A negative electrode was produced in the same manner as in Example 1 except that fumaric acid having an average particle diameter of 1 μm was used, and a test cell was produced in the same manner as in Example 1 except that the negative electrode was used. In the negative electrode of Comparative Example 2, the pore diameter distribution of the negative electrode mixture layer was measured by mercury porosimetry and showed one peak value R1, where the peak value R1 was 1 μm.

Comparative Example 3

A negative electrode was produced in the same manner as in Example 1 except that fumaric acid was not used, and a test cell was produced in the same manner as in Example 1 except that the negative electrode was used. In the negative electrode of Comparative Example 3, the pore diameter distribution of the negative electrode mixture layer was measured by mercury porosimetry and showed one peak value R1, where the peak value R1 was 1 μm.

Comparative Example 4

A negative electrode was produced in the same manner as in Example 1 except that graphite particles having an average particle diameter of 17 μm were mixed with a Si-based material having an average particle diameter of 8 μm, in which Si particles were dispersed in a carbon phase, at a mass ratio of 80:20, and a test cell was produced in the same manner as in Example 1 except that the negative electrode was used. In the negative electrode of Comparative Example 4, the pore diameter distribution of the negative electrode mixture layer was measured by mercury porosimetry and showed two peak values R1 and R2, where the peak value R1 was 1 μm and the peak value R2 was 6 μm.

Comparative Example 5

A negative electrode was produced in the same manner as in Example 1 except that a Si-based material having an average particle diameter of 3 μm in which Si particles were dispersed in a carbon phase was used, and a test cell was produced in the same manner as in Example 1 except that the negative electrode was used. In the negative electrode of Comparative Example 5, the pore diameter distribution of the negative electrode mixture layer was measured by mercury porosimetry and showed two peak values R1 and R2, where the peak value R1 was 1 μm and the peak value R2 was 6 μm.

Comparative Example 6

A negative electrode was produced in the same manner as in Example 1 except that the compressive force of rolling of the coating film was increased, and a test cell was produced in the same manner as in Example 1 except that the negative electrode was used. In the negative electrode of Comparative Example 6, the pore diameter distribution of the negative electrode mixture layer was measured by mercury porosimetry and showed two peak values R1 and R2, where the peak value R1 was 0.3 μm and the peak value R2 was 6 μm.

Comparative Example 7

A negative electrode was produced in the same manner as in Example 1 except that the compressive force of rolling of the coating film was decreased, and a test cell was produced in the same manner as in Example 1 except that the negative electrode was used. In the negative electrode of Comparative Example 7, the pore diameter distribution of the negative electrode mixture layer was measured by mercury porosimetry and showed two peak values R1 and R2, where the peak value R1 was 1.7 μm and the peak value R2 was 6 μm.

[Evaluation of Battery Capacity]

The test cell in each Example and Comparative Example was charged at a constant current of 0.5 C in a temperature environment of 25° C. until the battery voltage reached 4.2 V, and then charged at a constant voltage of 4.2 V until the current value reached 0.05 C. Thereafter, the battery was discharged at a constant current of 0.2 C until the battery voltage reached 2.5 V. The discharge capacity at this time was used as the battery capacity, and the results are summarized in Table 1.

[Charge-Discharge Cycle Test]

The test cell in each Example and Comparative Example was charged at a constant current of 0.5 C in a temperature environment of 25° C. until the battery voltage reached 4.2 V, and then charged at a constant voltage of 4.2 V until the current value reached 0.05 C. Thereafter, the battery was discharged at a constant current of 0.5 C until the battery voltage reached 2.5 V. Fifty cycles of this charge-discharge cycle were performed, and the capacity retention rate over the charge-discharge cycle was determined by the following equation, and the results are summarized in Table 1.

Capacity retention rate (%)=(discharge capacity at 50th cycle/discharge capacity at 1st cycle)×100

[Evaluation of Negative Electrode Swelling Rate]

The test cell in each of Examples and Comparative Examples was charged at a constant current of ⅓ C under a temperature environment of 25° C. until the battery voltage reached 4.2 V, and then charged at a constant voltage of 4.2 V until the current value reached 0.05 C. The test cell after the charge was disassembled, the negative electrode was taken out, and the thickness of the negative electrode after charging was measured with a micro gauge. Then, the negative electrode swelling rate was calculated by the following equation, and the results are summarized in Table 1.

Negative electrode swelling rate (%)=(thickness of negative electrode after charge/thickness of negative electrode at production of negative electrode)×100

TABLE 1

| Unit | R1 µm | R2 µm | Fumaric acid particle diameter µm | Si-based material content mass % | Si-based material particle diameter µm | Graphite particle diameter µm | Negative electrode swelling rate % | Battery capacity mAh | Capacity retention rate % |
|---|---|---|---|---|---|---|---|---|---|
| Example 1 | 1 | 6 | 6 | 50 | 8 | 17 | 125 | 550 | >95 |
| Example 2 | 1 | 2 | 2 | 50 | 8 | 17 | 128 | 551 | >95 |
| Example 3 | 1 | 10 | 10 | 50 | 8 | 17 | 119 | 523 | >95 |
| Example 4 | 1 | 6 | 6 | 30 | 8 | 17 | 121 | 502 | >95 |
| Example 5 | 1 | 6 | 6 | 60 | 8 | 17 | 128 | 572 | >95 |
| Example 6 | 1 | 6 | 6 | 50 | 4 | 17 | 117 | 550 | >95 |
| Example 7 | 1 | 6 | 6 | 50 | 12 | 17 | 129 | 551 | >95 |
| Example 8 | 1 | 6 | 6 | 50 | 8 | 10 | 129 | 552 | >95 |
| Example 9 | 1 | 6 | 6 | 50 | 8 | 25 | 122 | 550 | >95 |
| Example 10 | 1 | 6 | 6 | 70 | 8 | 17 | 135 | 588 | >95 |
| Example 11 | 1 | 6 | 6 | 50 | 14 | 17 | 137 | 550 | >95 |
| Example 12 | 1 | 6 | 6 | 50 | 8 | 8 | 136 | 548 | >95 |
| Example 13 | 1 | 6 | 6 | 50 | 8 | 40 | 135 | 552 | >95 |
| Comparative Example 1 | 1 | 12 | 12 | 50 | 8 | 17 | 116 | 492 | >95 |
| Comparative Example 2 | 1 | — | 1 | 50 | 8 | 17 | 146 | 550 | >95 |
| Comparative Example 3 | 1 | — | — | 50 | 8 | 17 | 150 | 548 | >95 |
| Comparative Example 4 | 1 | 6 | 6 | 20 | 8 | 17 | 119 | 471 | >95 |
| Comparative Example 5 | 1 | 6 | 6 | 50 | 3 | 17 | 115 | 548 | 88 |
| Comparative Example 6 | 0.3 | 6 | 6 | 50 | 8 | 17 | 125 | 558 | 88 |
| Comparative Example 7 | 1.7 | 6 | 6 | 50 | 8 | 17 | 125 | 474 | >95 |

As shown in Table 1, in all of Examples 1 to 13, the battery capacity was greater than or equal to 500 mAh, the capacity retention rate after 50 cycles was greater than or equal to 95%, and the swelling rate of the negative electrode was less than 140%. On the other hand, in Comparative Examples 1 to 7, the battery capacity was less than 500 mAh, the capacity retention rate was less than 90% after 50 cycles, or the swelling rate of the negative electrode was greater than or equal to 140%. That is, in the negative electrode mixture layer including the negative electrode active material containing the carbon material and the Si-based material, a high capacity of a battery can be achieved, swelling of the negative electrode can be suppressed, and a deterioration of charge-discharge cycle characteristics can be suppressed by using a negative electrode having a pore diameter distribution with two peak values R1 and R2 as measured by mercury porosimetry, the peak value R1 being greater than or equal to 0.5 µm and less than or equal to 1.5 µm, the peak value R2 being greater than or equal to 2 µm and less than or equal to 10 µm, the Si-based material having an average particle diameter of greater than or equal to 4 µm, and the Si-based material having a content of greater than or equal to 30 mass % of the total amount of the negative electrode active material.

REFERENCE SIGNS LIST

10 SECONDARY BATTERY
11 POSITIVE ELECTRODE
12 NEGATIVE ELECTRODE
13 SEPARATOR
14 ELECTRODE ASSEMBLY
15 BATTERY CASE
16 CASE BODY
17 SEALING ASSEMBLY
18.19 INSULATING PLATE
20 POSITIVE ELECTRODE LEAD
21 NEGATIVE ELECTRODE LEAD
22 PROJECTING PORTION
23 FILTER
24 LOWER VENT MEMBER
25 INSULATING MEMBER
26 UPPER VENT MEMBER
27 CAP
28 GASKET

The invention claimed is:

1. A negative electrode for a secondary battery comprising a negative electrode current collector and a negative electrode mixture layer disposed on the negative electrode current collector, wherein the negative electrode mixture layer comprises a negative electrode active material containing a carbon material and a Si-based material, the negative electrode mixture layer has a pore diameter distribution with two peak values R1 and R2 as measured by mercury porosimetry, the peak value R1 is greater than or equal to 0.5 µm and less than or equal to 1.5 µm, the peak value R2 is greater than or equal to 2 µm and less than or equal to 10 µm, the Si-based material has an average particle diameter of greater than or equal to 4 µm, and the Si-based material has a content of greater than or equal to 30 mass % of the total amount of the negative electrode active material.

2. The negative electrode for a secondary battery according to claim 1, wherein the Si-based material comprises a Si compound having a silicate phase and Si particles dispersed in the silicate phase.

3. The negative electrode for a secondary battery according to claim 1, wherein the Si-based material contains a Si compound having a carbon phase and Si particles dispersed in the carbon phase.

4. The negative electrode for a secondary battery according to claim 1, wherein the Si-based material has a content of greater than or equal to 30 mass % and less than or equal to 60 mass % of the total amount of the negative electrode active material.

5. The negative electrode for a secondary battery according to claim 1, wherein the Si-based material has an average particle diameter of greater than or equal to 4 µm and less than or equal to 12 µm.

6. The negative electrode for a secondary battery according to claim 1, wherein the carbon material comprises graphite.

7. The negative electrode for a secondary battery according to claim 1, wherein the carbon material has an average particle diameter of greater than or equal to 10 μm and less than or equal to 25 μm.

8. A secondary battery comprising the negative electrode for a secondary battery according to claim 1.

9. A method for producing a negative electrode for a secondary battery comprising:

a first step of applying a negative electrode paste including a negative electrode active material containing a carbon material and a Si-based material, and a pore-foaming material to a negative electrode current collector, and then rolling the coating film;

a second step of heat-treating the coating film after the first step, thereby decomposing and vaporizing the pore-forming material to form a negative electrode mixture layer, wherein the negative electrode mixture layer has a pore diameter distribution with two peak values R1 and R2 as measured by mercury porosimetry, the peak value R1 is greater than or equal to 0.5 μm and less than or equal to 1.5 μm, the peak value R2 is greater than or equal to 2 μm and less than or equal to 10 μm, the Si-based material has an average particle diameter of greater than or equal to 4 μm, and the Si-based material has a content of greater than or equal to 30 mass % of the total amount of the negative electrode active material.

* * * * *